July 14, 1942.  F. T. MATIA  2,290,061
APPARATUS FOR MILLING METALLIC STRIP
Filed Nov. 23, 1940

INVENTOR.
FRANK T. MATIA
BY Fay, Macklin, Gobrick & Fay
ATTORNEYS.

Patented July 14, 1942

2,290,061

UNITED STATES PATENT OFFICE 2,290,061

APPARATUS FOR MILLING METALLIC STRIP

Frank T. Matia, Cleveland Heights, Ohio, assignor to The Cleveland Graphite Bronze Company Application November 23, 1940, Serial No. 366,897

5 Claims. (Cl. 90—11)

This invention relates, as indicated, to apparatus for continuous or intermittent machining of metallic strip, slabs or the like, but has reference more particularly to apparatus for the milling of such strip or slabs for the purpose of securing material of uniform thickness with accurate and smooth surfaces.

In prior methods of machining bimetallic strip, it was necessary to maintain the strip under tension by means of pulling rolls arranged in front of the cutting tool and retarding rolls or other restraining means, such as a brake, arranged behind the cutting tool. In addition to its thus being maintained under tension, the strip was deflected from its normal plane of movement and passed over a support such as a shoe or roll while the surface was thus being machined. Under these conditions, excessive tension stresses were often imposed upon the surface layer of the strip, which resulted in cracking of such surface layer. This was especially true when the surface coating was of a hard alloy such as plastic bronze, or when the surface coating was relatively heavy. In the case of heavy stock which was being machined in flat slabs, a relatively large amount of scrap was produced, since it was necessary to pass the slab through the machine until it was engaged by both the pulling and retarding rolls before machining could be started. Similarly, there was scrap at the end of the slab as soon as the end left the retarding rolls, such scrap resulting from the fact that it was necessary, as hereinbefore mentioned, to have the strip under tension during the machining operation.

The invention has as its primary object the provision of improved apparatus for the machining of the surface of a moving metallic strip or slab while such strip or slab is maintained in a flat level condition.

Another object of the invention is to provide apparatus for the machining of the surface of a moving metallic strip or slab, through the use of which the production of scrap metal is reduced to a minimum.

A further object of the invention is to provide apparatus which is particularly applicable to the machining of bimetallic strip which is composed of a backing of hard metal such as steel and a surface layer of a softer metal such as plastic bronze.

To the accomplishment of the foregoing and related ends, said invention, then, consists of the means hereinafter fully described and particularly pointed out in the claims; the annexed drawing and the following description setting forth in detail certain means and one mode of carrying out the invention, such disclosed means and mode illustrating, however, but one of various ways in which the principle of the invention may be used.

Figures 1, 2, 3:
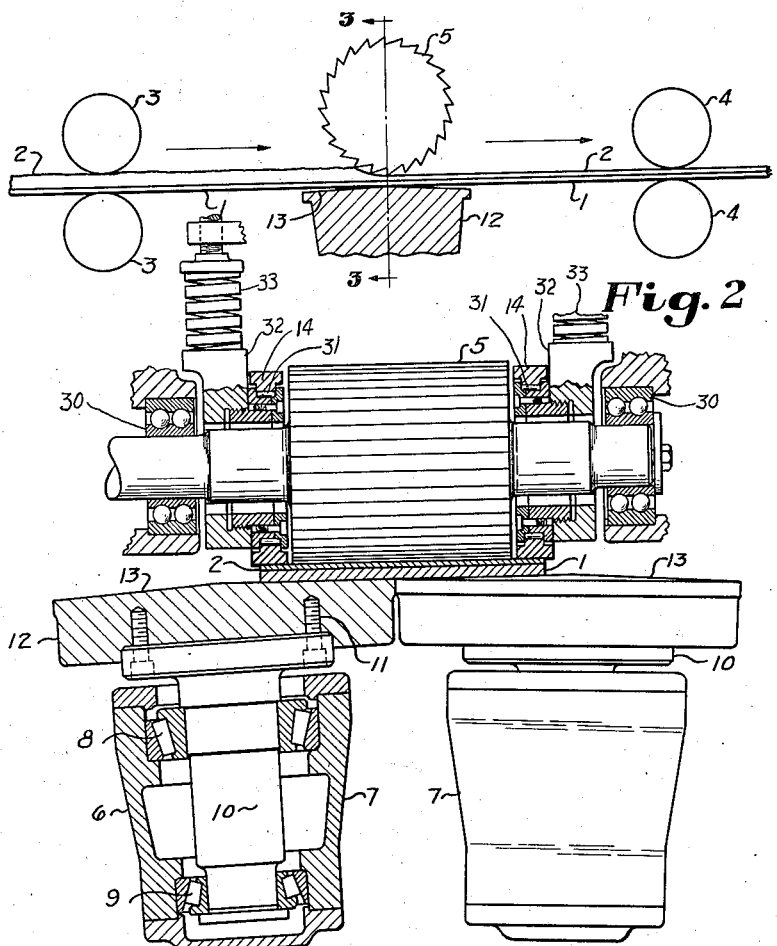
Fig. 1 is a side elevation, more or less diagrammatic in character, illustrating an apparatus adapted to carry out the steps of the improved method.
Fig. 2 is a plan view, taken on the line 2—2 of Fig. 1, but showing the milling cutter and one of the strip supporting units in elevation.
Fig. 3 is a cross-sectional view, taken on the line 3—3 of Fig. 2, showing the milling cutter and the strip supporting units.

Referring now to the drawing, a steel backing strip 1 having a relatively thick coating 2 thereon of plastic bronze or the like, is passed through sets of feed rolls 3 and 4, the roll 3 being a pusher roll and the roll 4 a pulling roll, the purpose of which is to positively feed the coated strip past a milling cutter 5 at a predetermined speed and to maintain the strip sufficiently taut with pressure rolls 14 so that it may be accurately presented to the milling cutter. The milling cutter 5 is supported in bearings 30.

The strip, at its point of passage under the milling cutter 5, is movably supported on its lower surface in a flat condition by means of a pair of strip supporting units 6 and on its edge portions by pressure rolls 14. Each unit comprises a housing 7, having revolubly mounted therein, as by means of spaced tapered roller bearings 8 and 9, a spindle 10, the upper end of which has secured thereto as by means of screws 11, a disc 12. The rolls 14 serve to hold the strip taut during the machining operation, especially when the strip is engaged by only one of the rolls such as 3 or 4. The rolls 14 are revolubly mounted on pin bearings 31, which, in turn, are supported on brackets 32. In order to resiliently urge the rolls 14 against the strip, the brackets 32 are engaged by means of coil springs 33, the tension of which may be varied so as to adjust the pressure of the rolls, there being sufficient clearance between the shaft of the milling cutter and the brackets 32 to permit such adjustments.

The upper surfaces 13 of the disc 12 is ground at an angle of 88° to the axis of the disc, and the units are arranged transversely of and below the strip with their axes at an angle of 2° to the vertical, so that the discs 12 engage the lower surface of the strip by a horizontal line contact normal to the direction of movement of the strip and firmly support the strip in a flat condition entirely across the width thereof, as clearly shown in Fig. 3. The respective angles of axes and the disc surfaces may vary so long as they provide a substantially uniformly flat surface of support for the strip.

By having the surface of the discs 12 ground at an angle and then mounting them at an angle to give a straight line contact transversely of the strip, an effect is created longitudinally which is similar to having the strip pass over a parabola. This is shown in Fig. 2 and it can be seen that the pressure area beneath the milling cutter is relatively small. The angle at which the discs are ground and mounted depends upon the pressure area desired but the present purpose 2° has been found satisfactory. In Fig. 1 the pressure area across the surface of the discs is shown as rectangular in shape although this particular shape may not be exactly correct, the purpose here being merely to show that the pressure area is small with relation to the area of the discs and as a result there is a minimum of friction produced between the strip and the discs. This feature results in a minimum of wear on the disc surfaces.

As the strip moves in the direction indicated by the arrows in Fig. 1, the discs 12, due to the friction of the strip thereon, freely rotate about their axes, but the strip is so firmly supported, and the friction between the strip and the discs is so small, due to the line contact therebetween, that a coating of uniform thickness and extremely accurate and smooth surface is secured as a result of the milling operation, without deflecting the strip from its normal plane of movement or subjecting the strip to the tension characteristics of former methods. Since it is unnecessary to exert any appreciable tension on the strip, the rolls 4 need not be driven at a speed greater than that at which the rolls 3 are driven.

When a strip is started through an apparatus, it is passed beneath the pusher rolls 3 and then beneath the milling cutter 5 and the pressure rolls 14. The strip can then be machined without any scrap at the ends since it will be held taut by the pressure rolls 14 and will be fed by the pusher roll 3. When the end of the strip is reached there is still no scrap since when it passes beneath the pusher rolls 3 it is still held taut by rolls 14 and pulled by rolls 4. It is to be understood that the strip must be sufficiently rigid to allow this operation, since a very thin strip might buckle if being pushed through by roll 3 before it became engaged with roll 4. The saving with this feature is very considerable especially when the apparatus is used intermittently.

Other modes of applying the principle of my invention may be employed instead of the one explained, change being made as regards the means herein disclosed, provided those stated by any of the following claims or their equivalent be employed.

I therefore particularly point out and distinctly claim as my invention:

1. In apparatus of the character described, the combination of means adapted to engage a metallic strip at points spaced longitudinally thereof, said means being adapted to progressively move said strip longitudinally, cutting means disposed between said first-named means and adapted to machine one surface of the strip, and means for supporting the portion of the strip which is to be machined, said last-named means comprising a pair of discs revoluble about axes inclined slightly to the vertical.

2. In apparatus of the character described, the combination of means adapted to engage a metallic strip at points spaced longitudinally thereof, said means being adapted to progressively move said strip longitudinally, cutting means disposed between said first-named means and adapted to machine one surface of the strip, and means for supporting the portion of the strip which is to be machined, said last-named means comprising a pair of discs adapted to engage the under surface of said strip with a line contact extending transversely of said surface.

3. In apparatus of the character described, the combination of means adapted to engage a metallic strip at points spaced longitudinally thereof, said means being adapted to progressively move said strip longitudinally, cutting means disposed between said first-named means and adapted to machine one surface of the strip, and means for supporting the portion of the strip which is to be machined, said last-named means comprising a pair of discs adapted to engage the under surface of said strip with a line contact extending transversely of said surface, and revoluble about axes inclined at an angle of about 2° to the vertical.

4. In apparatus of the character described, the combination of means adapted to engage a metallic strip at points spaced longitudinally thereof, said means being adapted to progressively move said strip longitudinally, cutting means disposed between said first-named means and adapted to machine one surface of the strip, and means for supporting the portion of the strip which is to be machined, said last-named means comprising a pair of discs having their upper surfaces at an angle of about 2° to the axes of said discs, and jointly supporting said strip by engagement of said surfaces with the under surface of said strip below the point of machining, said discs being supported for rotation about their axes.

5. In apparatus of the character described, the combination of means adapted to engage a metallic strip at points spaced longitudinally thereof, said means being adapted to progressively move said strip longitudinally, cutting means disposed between said first-named means and adapted to machine one surface of the strip, and means for supporting the portion of the strip which is to be machined, said last named means comprising a pair of discs having their upper surfaces at an angle to the axes of said discs, and jointly supporting said strip by engagement of said surfaces with the under surface of said strip below the point of machining, each of said discs being supported for rotation about its axis at an angle to the vertical equal to the angle between the disc surface and a plane normal to said axis.

FRANK T. MATIA.